United States Patent
Choi et al.

(10) Patent No.: US 9,622,272 B2
(45) Date of Patent: Apr. 11, 2017

(54) METHOD BY WHICH TERMINAL PERFORMS COMMUNICATION IN HETEROGENEOUS CELL ENVIRONMENT AND TERMINAL

(71) Applicant: LG ELECTRONICS INC., Seoul (KR)

(72) Inventors: Hyeyoung Choi, Seoul (KR); Jaehoon Chung, Seoul (KR); Ilmu Byun, Seoul (KR); Eunjong Lee, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/900,580

(22) PCT Filed: Jun. 11, 2014

(86) PCT No.: PCT/KR2014/005124
§ 371 (c)(1),
(2) Date: Dec. 21, 2015

(87) PCT Pub. No.: WO2015/002389
PCT Pub. Date: Jan. 8, 2015

(65) Prior Publication Data
US 2016/0374119 A1 Dec. 22, 2016

Related U.S. Application Data

(60) Provisional application No. 61/843,041, filed on Jul. 4, 2013.

(51) Int. Cl.
*H04W 36/00* (2009.01)
*H04W 4/00* (2009.01)
(Continued)

(52) U.S. Cl.
CPC .......... *H04W 76/02* (2013.01); *H04W 16/32* (2013.01)

(58) Field of Classification Search
CPC ..................... H04W 84/045; H04W 36/0061
(Continued)

(56) References Cited

U.S. PATENT DOCUMENTS

| | | | |
|---|---|---|---|
| 2015/0045038 A1* | 2/2015 | Gao | H04W 36/22 455/438 |
| 2015/0099522 A1* | 4/2015 | Yie | H04W 72/082 455/437 |

(Continued)

OTHER PUBLICATIONS

LG Electronics, "Analysis and observations on cell association with actual cell loading," 3GPP TSG RAN WG1 Meeting #73, R1-132238, May 2013, 5 pages.

(Continued)

*Primary Examiner* — Kiet Doan
(74) *Attorney, Agent, or Firm* — Lee, Hong, Degerman, Kang & Waimey PC

(57) ABSTRACT

Disclosed are a communication performing method and terminal, and the method is a method by which a terminal with dual connectivity performs communication in a heterogeneous cell environment, in which: a first reporting message reporting that a downlink signal is received from a small cell in an intensity greater than a threshold value is transmitted to a macro cell; an RRC establishment message indicating a connection to a small cell cluster is received from the macro cell; connections are added to a plurality of small cells included in the small cell cluster according to additional time information included in the RRC establishment message; and the connections to the plurality of added small cells are respectively activated according to activation connection time information included in the RRC establish-
(Continued)

MeNB : macro eNode B
PeNB : pico eNodeB
FeNB : femto eNode B

MUE : macro UE
PUE : pico UE
FUE : femto UE ment message, and the small cell cluster is determined on the basis of information on a location relationship among the plurality of small cells.

18 Claims, 12 Drawing Sheets

(51) Int. Cl.
*H04W 76/02* (2009.01)
*H04W 16/32* (2009.01)

(58) Field of Classification Search
USPC .......... 455/444, 438, 67.11, 452.2, 437; 370/311, 336, 280, 328
See application file for complete search history.

(56) References Cited

U.S. PATENT DOCUMENTS

2016/0050649 A1* 2/2016 Park .............. H04W 76/041
370/329
2016/0337909 A1* 11/2016 Cai .............. H04W 36/0033

OTHER PUBLICATIONS

China Telecom, "Discussion on dual connectivity," 3GPP TSG RAN WG1 Meeting #73 (Resubmission of R1-131138), R1-132205, May 2013, 4 pages.

Samsung, "Evaluation-related Small Cell Enhancements SID Clarifications," 3GPP TSG-RAN WG1#72 meeting, R1-130297, Jan. 2013, 3 pages.

NEC Group, "Small cell operation under macro coverage," 3GPP TSG RAN WG1 Meeting #72, R1-130373, Jan. 2013, 3 pages.

Samsung, "Evaluation assumption for dual connectivity in scenario 2," 3GPP TSG RAN WG1 Meeting #72b, R1-131020, Apr. 2013, 3 pages.

PCT International Application No. PCT/KR2014/005124, Written Opinion of the International Searching Authority dated Sep. 25, 2014, 14 pages.

* cited by examiner

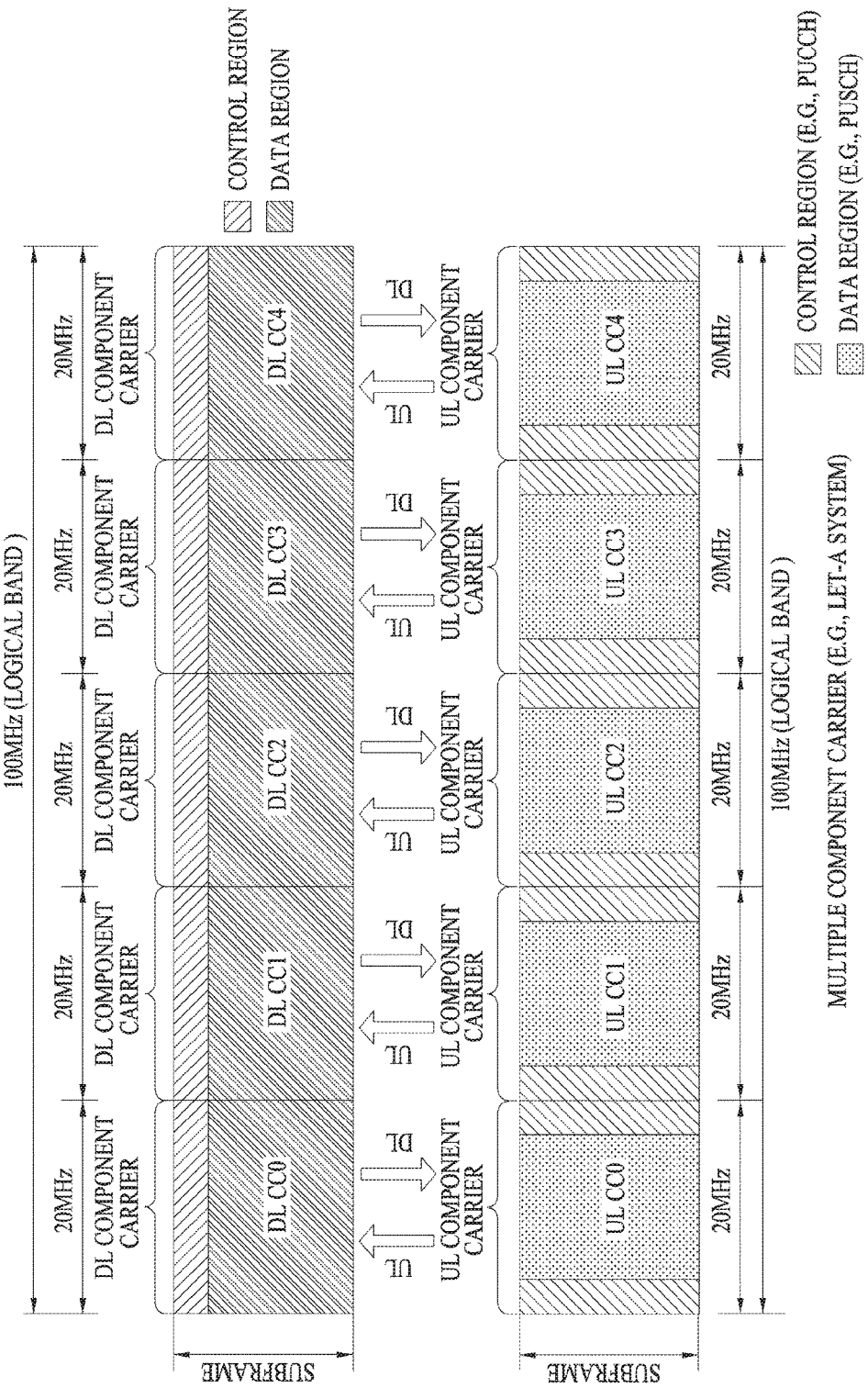

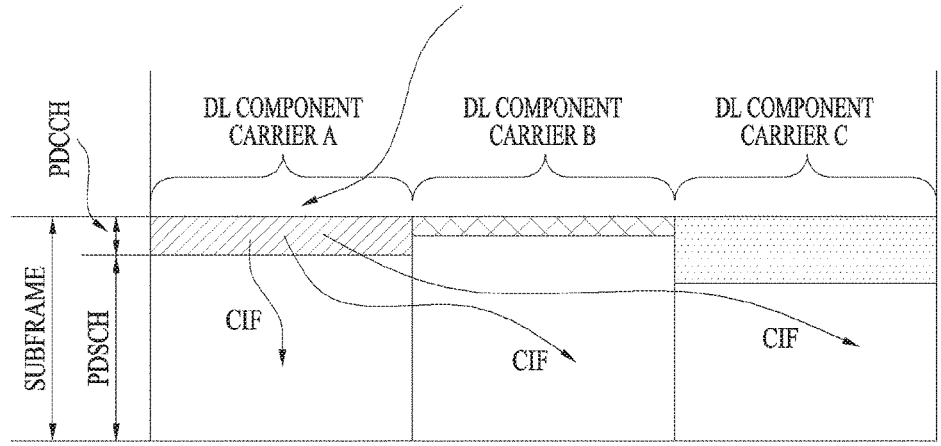
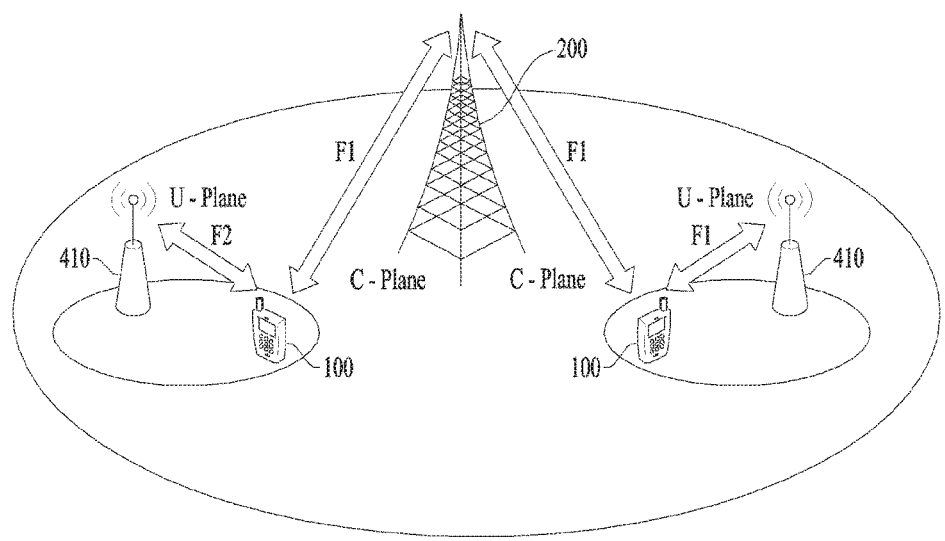

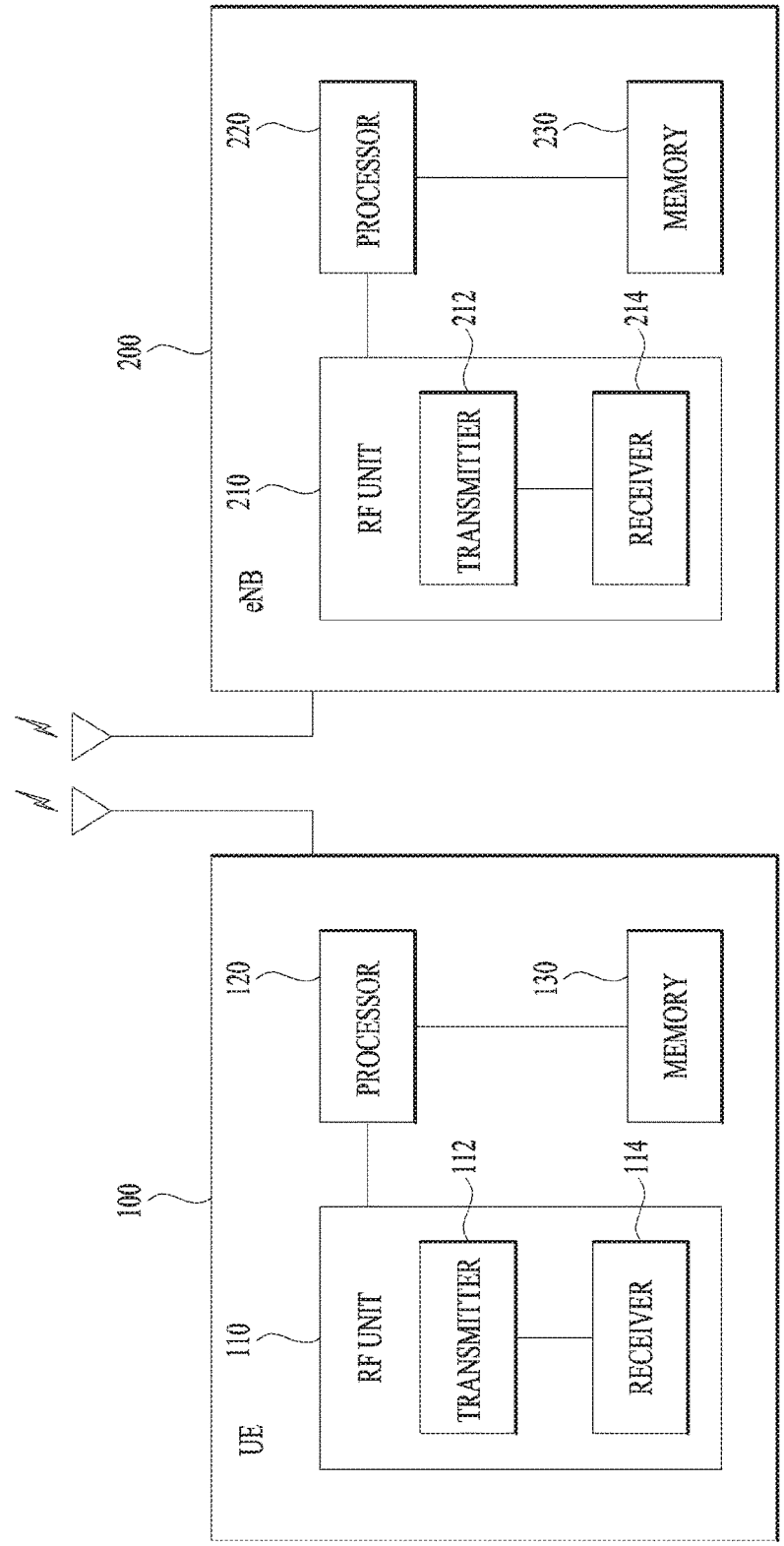

METHOD BY WHICH TERMINAL PERFORMS COMMUNICATION IN HETEROGENEOUS CELL ENVIRONMENT AND TERMINAL

CROSS-REFERENCE TO RELATED APPLICATIONS

This application is the National Stage filing under 35 U.S.C. 371 of International Application No. PCT/KR2014/005124, filed on Jun. 11, 2014, which claims the benefit of U.S. Provisional Application No. 61/843,041, filed on Jul. 4, 2013, the contents of which are all hereby incorporated by reference herein in their entirety.

FIELD OF THE INVENTION

The present invention corresponds to a technology related to a method by which a terminal (or user equipment) performs communication in a heterogeneous cell environment, wherein a macro cell and a small cell co-exist, and the terminal (or user equipment).

BACKGROUND ART

A radio access network (RAN) configuration has been changed such that various types of small cells such as a pico cell, a femto cell, etc. interact with a macro cell. The RAN configuration refers to a heterogeneous cell configuration or a hierarchical cell configuration in which small cells for low power/near field communication coexist in addition to an existing macro cell-based homogeneous network.

It is inefficient to additionally install a macro cell eNB in a complex urban environment like in a conventional art. This is because system throughput enhancement is not high compared with increase in costs and complexity for additional installment of macro cells due to shadow areas of a communication environment. Accordingly, in a new heterogeneous cell structure, a plurality of small cells coexists in a macro cell and serves corresponding UEs by resource allocation based on cell coordination. The heterogeneous cell structure is used to enhance quality of experience (QoE) by providing a high data transmission rate to a last user.

In small cell enhancements for E-UTRA and E-UTRAN study item (SI) as one of 3rd generation partnership project (3GPP) standard scopes, research has been ongoing into enhancement of indoor/outdoor scenarios using low power nodes, and the scenarios is described in 3GPP TR 36.932. In small cell enhancements for E-UTRA and E-UTRAN SI, research has been conduced to draw advantages of concept of dual connectivity to small cell layers and a macro cell layer in which a user uses the same or different carriers.

DETAILED DESCRIPTION OF THE INVENTION

Technical Objects

The present invention is devised to resolve general technical problems that are described above, and, accordingly, an object of the present invention is to allow a user equipment (or terminal) to easily perform communication in a heterogeneous cell environment having dual connectivity.

Another object of the present invention is to allow the user equipment to efficiently perform communication, wherein the user equipment moves within a coverage of a macro cell along a predetermined movement path.

Yet another object of the present invention is to reduce overhead of a signal for allowing the user equipment to perform communication in an environment having a plurality of small cells positioned therein.

The technical objects of the present invention will not be limited only to the objects described above. Accordingly, technical objects that have not been mentioned above or additional technical objects of the present application may be considered by those having ordinary skill in the art from the description presented below.

Technical Solutions

Hereinafter, in order to resolve the above-described technical problems, a method of enhancing communication efficiency by reducing the overhead of the user equipment, which moves along a movement path, is disclosed herein.

Effects of the Invention

According to the exemplary embodiments of the present invention, the following effects may be anticipated.

Firstly, the user equipment is capable of easily performing communication with a plurality of small cells without interruption (or disconnection) in a heterogeneous cell environment.

Secondly, the user equipment may experience less load (or burden) from having to receive RRC configuration messages (or RRC establishment messages) over a plurality of times from the macro cell in order to perform RRC connection.

Thirdly, even if there is a change in the network situation of the user equipment or a change in a movement rate of the user equipment, the connection status respective to the small cells may be efficiently changed.

It will be appreciated by persons skilled in the art that that the effects that can be achieved through the embodiments of the present invention are not limited to those described above and other advantages of the present invention will be more clearly understood from the following detailed description. That is, unintended effects according to implementation of the present invention may be devised by a person skilled in the art through the embodiments of the present invention.

BRIEF DESCRIPTION OF THE DRAWINGS

The accompanying drawings, which are included to provide a further understanding of the invention, illustrate embodiments of the invention and together with the description serve to explain the principle of the invention. The technical features of the present invention are not limited to a specific drawing, and some of the features illustrated in the respective drawings may be combined to constitute a new embodiment. The reference numerals in the drawings represent structural elements. In the drawings:

FIG. 2 illustrates carrier aggregation being associated with the present invention.

FIG. 3 illustrates cross scheduling corresponding to a case when multiple carriers are aggregated and being associated with the present invention.

FIG. 4 illustrates dual connectivity being associated with the present invention.

FIG. 13 illustrates a block view showing configurations of a user equipment and a base station according to an exemplary embodiment of the present invention.

BEST MODE FOR CARRYING OUT THE PRESENT INVENTION

Figure 1:
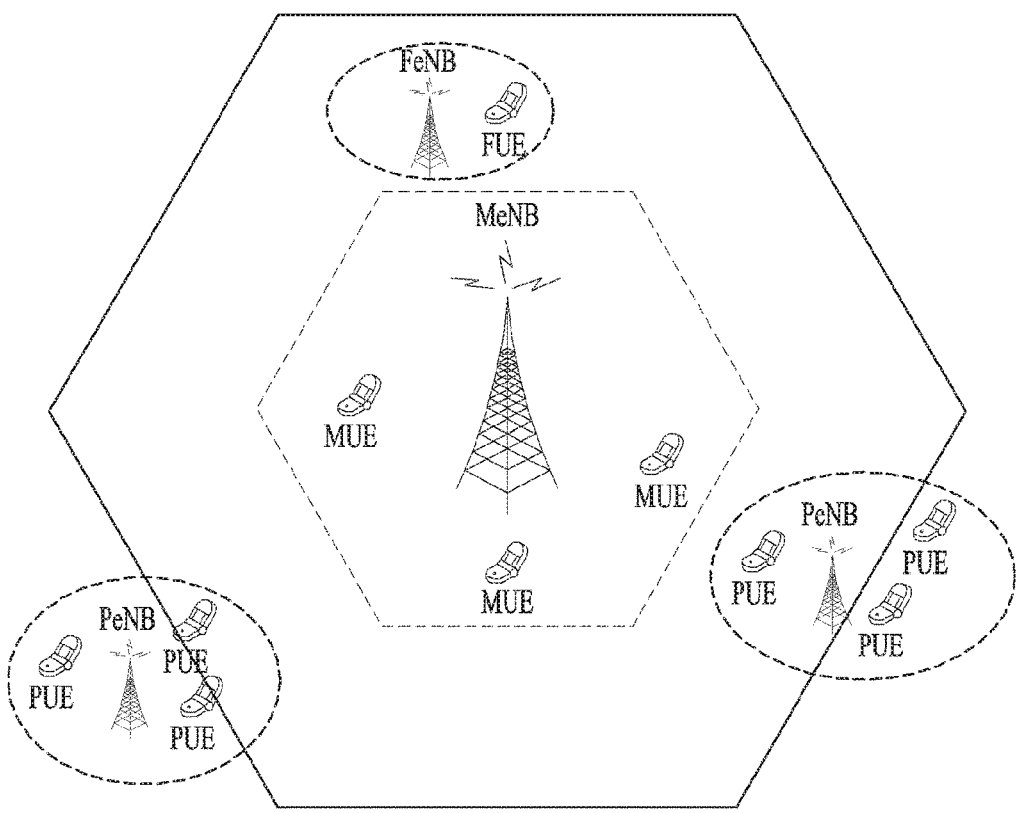
FIG. 1 illustrates a heterogeneous network environment being associated with the present invention.

A method for performing communication configured to resolve the above-described technical problem may include the steps of transmitting a first report message to the macro cell, the first report message reporting that a downlink signal is received from a small cell at an intensity level greater than or equal to a threshold value, receiving a RRC configuration message (Radio Resource Control configuration message) from the macro cell, the RRC configuration message indicating a connection with a small cell cluster including the small cells from the macro cell, adding connections with a plurality of small cells included in the small cell cluster in accordance with addition time information, the addition time information being included in the RRC configuration message, and activating connections with each of the plurality of small cells, the connections being added in accordance with activation time information, the activation time information being included in the RRC configuration message, wherein the small cell cluster may be determined based on information on a location relationship between the plurality of small cells.

The method for performing communication may further include a step of performing communication in a RRC connected state through an activated connection with the small cell.

In case the addition time information indicates a same time point with respect to the plurality of small cells, the adding step may add the connection with the plurality of small cells simultaneously.

In case the addition time information indicates different time points with respect to the plurality of small cells, the adding step may sequentially add the connection with the plurality of small cells in accordance with the addition time information.

In case a downlink signal having an intensity lower than a threshold value is received from the activated small cell, the method for performing communication may further include the steps of transmitting a second report message to the macro cell, receiving a RRC reconfiguration message from the macro cell, the RRC reconfiguration message indicating a removal of a connection with the small cell cluster, and removing the connection with the plurality of small cells included in the small cell cluster in accordance with removal time information being included in the RRC reconfiguration message.

The RRC reconfiguration message may further include deactivation time information, and the method for performing communication may further include a step of deactivating the activated connection with the small cell in accordance with the deactivation time information, prior to deactivating the connection with the plurality of small cells.

The RRC configuration message may include at least one of PCID (Physical Cell ID), ECGI (E-UTRAN Cell Global Identifier), frequency, CIF (Carrier Indicator Field), the addition time information, the activation time information, deactivation time information, and removal time information of each of the plurality of small cells.

The macro cell may acquire information related to the location relationship by using at least one of PRACH (Physical Random Access Channel) transmission with the plurality of small cells, OTDOA (Observed Time Difference of Arrival) process, and GPS (Global Positioning System).

The method for performing communication may further include a step of measuring a movement speed of the user equipment, and, in case the RRC configuration message directs an application of the movement speed, the adding step and the activating step may respectively adjust the addition time information and the activation time information in accordance with the movement speed.

A user equipment configured to resolve the above-described technical problem may include a transmitting unit, a receiving unit, and a processor, wherein the processor may be configured to control the transmitting unit so as to transmit a first report message to the macro cell, the first report message reporting that a downlink signal is received from a small cell at an intensity level greater than or equal to a threshold value, to control the receiving unit so as to receive a RRC configuration message (Radio Resource Control configuration message) from the macro cell, the RRC configuration message indicating a connection with a small cell cluster including the small cells from the macro cell, to add connections with a plurality of small cells included in the small cell cluster in accordance with addition time information, the addition time information being included in the RRC configuration message, and to activate connections with each of the plurality of small cells, the connections being added in accordance with activation time information, the activation time information being included in the RRC configuration message, wherein the small cell cluster may be determined based on information on a location relationship between the plurality of small cells.

MODE FOR CARRYING OUT THE PRESENT INVENTION

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. The term '-unit', '-or (er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', an advanced base station (ABS), or an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS)', 'terminal', etc.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

In addition, the expression that a device communicates with a 'cell' means that the device transmits and receives signals to and from an eNB of the corresponding cell. That is, an actual object to and from which the device transmits and receives signals may be a specific eNB. However, for convenience of description, the device transmits and receives signals to and from a cell formed by the specific cell. Similarly, the terms 'macro cell' and/or 'small cell' may refer to corresponding specific coverage and also refer to 'an eNB for supporting a macro cell' and/or 'a small cell eNB for supporting a small cell'.

The embodiments of the present invention are supported by standard documents disclosed in at least one of the Institute of Electrical and Electronic Engineers (IEEE) 802.xx system, the 3rd generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

1. Heterogeneous Network Deployment

FIG. 1 illustrates a heterogeneous network wireless deployment according to the present invention.

To guarantee a more stable data service such as multimedia service in future-generation mobile communication, much attention has been attracted to a hierarchical cell structure or heterogeneous cell structure in which micro cells (pico cells or femto cells) are co-located within a macro cell-based homogeneous network. This is because installation of additional macro eNode Bs is inefficient in terms of cost and complexity relative to system performance improvement.

A heterogeneous network configuration under consideration for a future-generation communication network may be formed as illustrated in FIG. 1. A plurality of small cells may coexist in one macro cell and each serve corresponding UEs by resource allocation based on cell coordination.

The above small cells are categorized into two types depending on their access schemes of UEs. First, small cells using open access subscriber group (OSG) or non closed subscriber group (Non-CSG) scheme are accessible to UEs connected to a macro cell and/or UEs connected to other small cells. The OSG or Non-CSG scheme enables handover to the small cells from other cells.

Second, small cells using a closed subscriber group (CSG) scheme are not accessible to unauthorized UEs connected to a macro cell and/or unauthorized UEs connected to other small cells. In addition, the CSG scheme does not allow handover to the small cells from other cells.

2. Carrier Aggregation and Dual Connectivity

FIG. 2 is a diagram illustrating carrier aggregation according to the present invention.

Referring to FIG. 2, a communication system may collect a plurality of uplink/downlink component carriers (CCs) to support wider uplink/downlink bandwidths. The term "CC" may be replaced with other equivalent terms (e.g., a carrier, a cell, etc.). CCs may or may not be adjacent to each other in the frequency domain. A bandwidth of CCs may be independently determined. Asymmetrical carrier aggregation with UL CCs and DL CCs, the numbers of which are different, is possible. Control information may be configured to be transmitted and received through a specific CC. The specific CC may be referred to as a primary CC (or an anchor CC) and the remaining CCs may be referred to as a secondary CC.

When cross-carrier scheduling (or cross-CC scheduling) is applied, PDCCH for downlink allocation may be transmitted to DL CC#0, and the corresponding PDSCH may be transmitted to DL CC#2. Moreover, for cross-CC scheduling of LTE-advanced (LTE-A) UEs, the introduction of carrier indicator field (CIF) has been considered. Configuration for the presence or absence of the CIF within PDCCH is semi-statically and UE-specifically (UE-group-specifically) enabled by higher layer signaling (e.g., RRC signaling). The baseline of PDCCH transmission is summarized as below.

1) CIF disabled: PDCCH on a DL CC assigns PDSCH resources on the same DL CC or PUSCH resources on a single linked UL CC 1-1) No CIF 1-2) The same as Rel-8 PDCCH structure (the same coding and the same CCE-based resource mapping) and DCI formats 2) CIF enabled: PDCCH on a DL CC can assign PDSCH or PUSCH resources in one of multiple aggregated DL/UL CCs using the CIF 2-1) LTE DCI format extended with the CIF 2-1-1) CIF (if configured) is a fixed x-bit field (e.g., x=3)

2-1-2) CIF (if configured) location is fixed irrespective of DCI format size 2-2) Reusing LTE PDCCH structure (the same coding and the same CCE-based resource mapping)

FIG. 3 is a diagram illustrating cross scheduling in the case of aggregation of a plurality of carriers according to the present invention.

In the case of presence of CIF, the eNB may assign the PDCCH monitoring DL CC set for reduction of blind decoding complexity at the UE side. The PDCCH monitoring DL CC set is a portion of the entire aggregated DL CCs and includes one or more DL CC, and the UE only performs detection/decoding of PDCCHs on the corresponding DL CC. In other words, upon scheduling PDSCH/PUSCH for a UE, the eNB transmits PDCCHs only through the PDCCH monitoring DL CC set. The PDCCH monitoring DL CC set may be set UE-specifically, UE-group-specifically, or cell-specifically. The term "PDCCH monitoring DL CC" may be replaced with the equivalent terms such as a monitoring carrier, a monitoring cell, etc. In addition, CCs aggregated for the UE may be replaced with the equivalent terms such as a serving CC, a serving carrier, a serving cell, etc.

As illustrated in FIG. 3, three DL CCs may be aggregated. In FIG. 3, DL CC A is configured as the PDCCH monitoring DL CC. DL CC A, B, and C may each be referred to as a serving CC, a serving carrier, a serving cell, etc. When the CIF is disabled, each DL CC can transmit only the PDCCH scheduling its own PDSCH without the CIF according to LTE PDCCH configuration. On the other hand, when the CIF is enabled by UE-specific (or UE-group-specific or cell-specific) higher layer signaling, only DL CC A (monitoring DL CC) can transmit the PDCCHs scheduling not only its own PDSCH but also PDSCHs of the other CCs using the CIF. In this case, no PDCCH is transmitted on DL CC B and C which are not configured as the PDCCH monitoring DL CC. Accordingly, DL CC A (monitoring DL CC) needs to include all of a PDCCH search range associated with DL CC A, a PDCCH search range associated with DL CC B, and a PDCCH search range associated with DL CC C. In this specification, it is assumed that the PDCCH search ranges are defined for the respective carriers.

As described above, LTE-A has considered the introduction of CIF for cross-CC scheduling. Whether the CIF is used (that is, whether a cross-CC scheduling mode or a non-cross-CC scheduling mode is supported) and conversion between modes may be configured via RRC signaling semi-statically/UE-specifically. The UE may perform the RRC signaling and then check whether the CIF is used in PDCCH scheduled to the UE.

FIG. 4 is a diagram for explanation of dual connectivity according to the present invention.

A UE 100 within the coverage of first and second small-cell eNBs 410 and 420 may be connected simultaneously to a small cell and a macro cell by a macro-cell eNB 200. The UE 100 may receive a service from a macro cell or a small cell simultaneously or in a time division multiplying (TDM) scheme. Backhaul between the macro cell and the small cell may be ideal backhaul or non-ideal backhaul.

The UE 100 may receive a service of control plane (C-plane) functionalities (connection management and mobility) through a macro cell layer. In addition, the UE 100 may select user plane (U-plane) functionalities from the macro cell and/or the small cell and receive a service of the U-plane functionalities. FIG. 4 illustrates an embodiment in which a small cell is a data path of the U-plane.

For example, data may be transmitted in real time by a service such as voice over long term evolution (VoLTE). When the UE 100 moves and receives from the VoLTE service from a small cell, interruption of the service may occur frequently. Thus, the UE 100 may receive a service from a macro cell in which continuity is ensured relative to a small cell. On the other hand, the UE 100 may receive a service that requires high efficiency from a small cell.

The macro cell and the small cell may perform carrier aggregation. That is, the macro cell and the small cell may user the respective random n and k (n and k are natural numbers) carriers. In this case, carriers of the macro cell and small cell may be different or some carriers may be commonly used by the macro cell and small cell. For example, the macro cell may use subcarriers with frequencies f1 and f2 and the small cell may use subcarriers with frequencies f2 and f3.

Referring to FIG. 4, the macro-cell eNB 200 and the first small-cell eNB 410 may uses subcarriers with different frequencies F1 and F2. On the other hand, the macro-cell eNB 200 and the second small-cell eNB 420 may use the same frequency band F1 in order to provide a service to the UE 100. The UE 100 configured to have dual connectivity may be simultaneously connected to both a macro cell by the macro-cell eNB 200 and a small cell by the small-cell eNBs 410 and 420.

A detailed description will be given in such a way that the aforementioned dual connectivity is similar to inter-site (or inter-band) carrier aggregation for aggregating carriers in different bands. That is, the detailed description will be given in such a way that a macro cell is a primary cell (PCell) by a primary CCE in carrier aggregation and a small cell is a secondary cell (SCell) by a secondary CC in carrier aggregation.

However, dual connectivity in a heterogeneous network deployment needs to be distinguished from carrier aggregation. That is, dual connectivity between a macro cell and a small cell is interpreted as adding geographical/positional concept, but not carrier aggregation in a single eNB. In more detail, when the UE 100 is positioned in a small cell by the first small-cell eNB 410 or positioned in a small cell by the second small-cell eNB 420, the UE 100 may simultaneously communicate with the first and second small-cell eNBs 410 and 420 that are geographically/positionally separated while receiving a service from the macro-cell eNB 200.

The legacy LTE (Rel-8/9) and LTE-A considers carrier aggregation in order to configure PCell and SCell(s) for one UE by an eNB. The PCell and SCell configured to the UE via carrier aggregation are scheduled by the same scheduler.

However, when a UE has dual connectivity in the aforementioned heterogeneous network deployment (that is, when the UE is simultaneously connected to both a macro cell and a small cell), the UE may be independently scheduled with respect to the macro cell and the small cell from separate schedulers. That is, the UE may be scheduled with the PCell from the macro cell and scheduled with the SCell from the small cell.

The UE having dual connectivity may be allocated resources from different network points (e.g., a master eNB and a secondary eNB) connected via non-ideal backhaul. In this case, the master eNB (MeNB) may function as a mobility anchor to an eNB corresponding to S1-MME connection from a core network (CN) in dual connectivity. A group of serving cells associated with the master eNB may be defined as a master cell group. A secondary eNB (SeNB) is an eNB for providing additional resources for a UE and may be defined to be distinguished from a master eNB (i.e., the SeNB may be defined as an eNB that is not the master eNB). In addition, similarly to a master cell group, a group of serving cells associated with the SeNB may be defined as a secondary cell group.

In this specification, the UE having dual connectivity may receive a service from a PCell via connection with a macro cell and may receive a service from a SCell via connection with a small cell. That is, in this specification, an operation performed on the "PCell" may refer to an operation performed on a "macro cell" that serves the PCell, and an operation performed on the "SCell" may refer to an operation performed on a "small cell" that serves the SCell.

However, the terms are selected for convenience of description only. That is, terms "PCell" and "SCell" may be interpreted as various meanings according to a cell type and are not limited to the aforementioned meanings. For example, the "PCell" and the "SCell" may refer to a macro cell and a small cell, respectively and also refer to the "master eNB)" and the "secondary eNB", respectively. In addition, the "PCell" and the "SCell" may refer to the "master cell group" associated with the MeNB and the "secondary cell group" associated with the SeNB, respectively.

Figure 5:
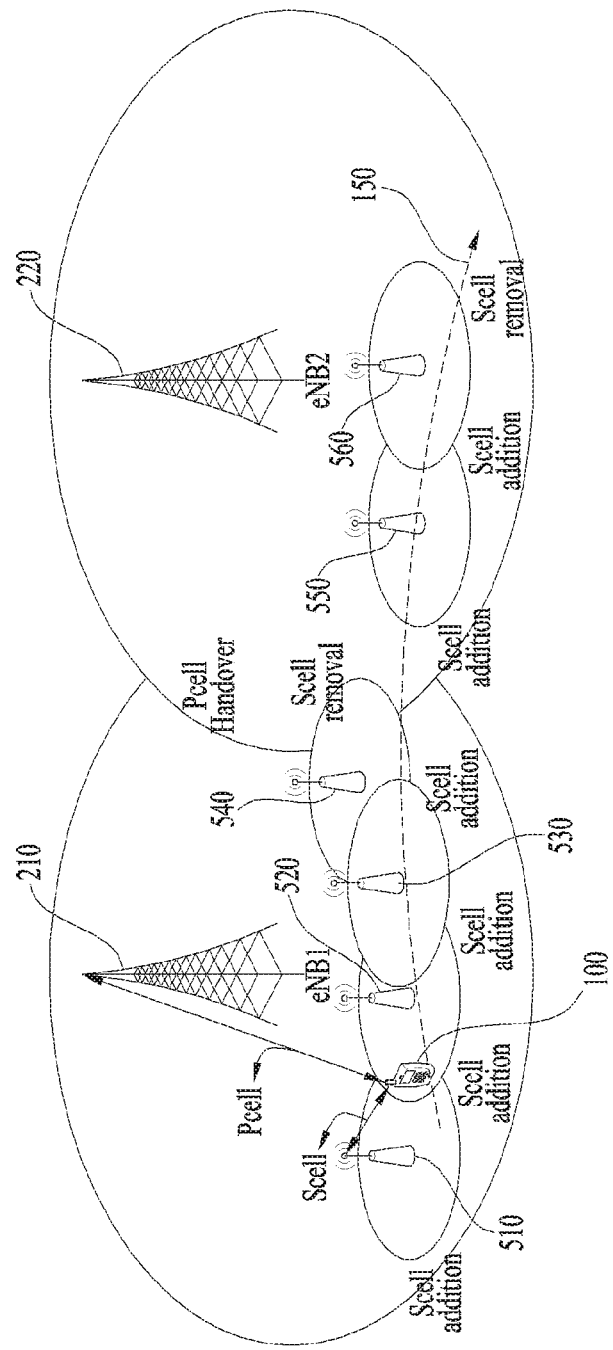
FIG. 5 illustrates dual connectivity according to movements of a user equipment in association with the present invention.

FIG. 5 illustrates dual connectivity according to movements of a user equipment in association with the present invention. FIG. 5 illustrates a heterogeneous cell structure of a macro cell configured of macro cell base stations (210, 220) and a small cell configured of a plurality of small cell base stations (510, 520, 530, 540, 550, 560).

In order to increase system capacity in a heterogeneous cell structure, a plurality of small cells may be densely positioned. Meanwhile, a user equipment (100), which is simultaneously connected to the macro cell and the small cell in accordance with dual connectivity (or inter-site carrier aggregation) may move within the coverage of the macro cell and the small cell. The user equipment (100) may move along path 150, so as to be capable of performing addition and/or removal of a plurality of small cells. More specifically, after undergoing a RRC establishment procedure with the plurality of small cell base stations (510, 520, 530, 540, 550, 560). Additionally, the user equipment (100) may perform activation/deactivation on the plurality of small cells. In case a message activating the small cell is received from the macro cell, the user equipment (100) may receive a downlink signal (e.g., DCI format, and so on) of the small cell and may transmit an uplink signal (e.g., PRACH, SRS signal, and so on).

As described above, in case a connection with the small cell is added/removed/activated/deactivated, the macro cell base station (200) or the small cell base stations (510, 520, 530, 540, 550, 560) shall transmit a message, which is configured to indicate the user equipment (100) of the operations of each base station, to the user equipment (100). More specifically, the user equipment (100) shall receive a RRC establishment message each time its connection status with small cells. Accordingly, as described above, in an environment having small cells concentrated therein, excessive overhead of the signal for delivering messages to the user equipment (100) may unnecessarily occur.

3. Method for Performing Communication

Figure 6:
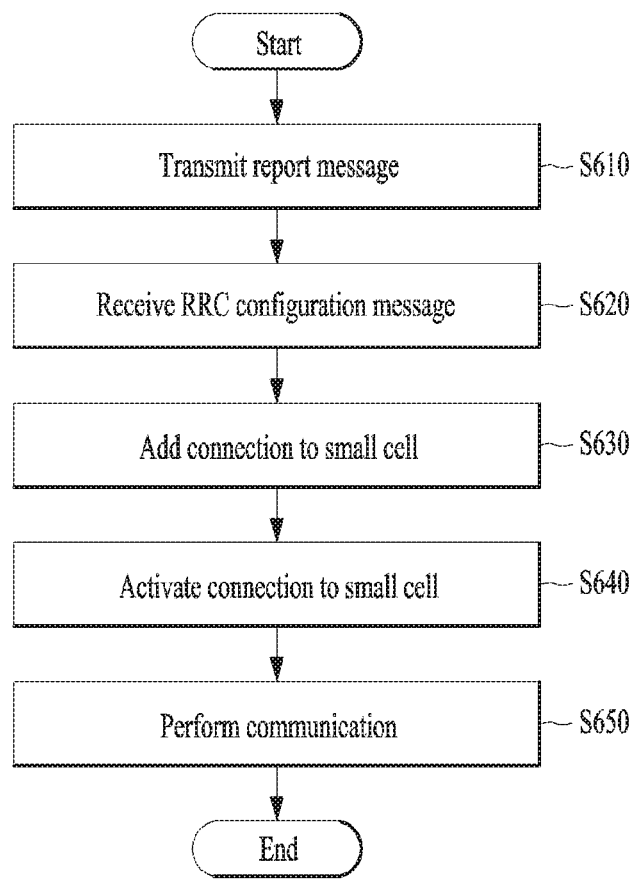
FIG. 6 illustrates a method for performing communication of a user equipment being associated with an exemplary embodiment of the present invention.

FIG. 6 illustrates a method for performing communication of a user equipment being associated with an exemplary embodiment of the present invention. FIG. 6 describes a method of allowing the user equipment having dual connectivity with respect to the macro cell and the small cell in a heterogeneous cell environment to perform communication.

In the exemplary embodiment of the present invention, the macro cell base station of the heterogeneous environment may acquire information on a location relationship between small cells, which are positioned to overlay with the macro cell. For example, by transmitting a PRACH (Physical Random Access CHannel) to the neighboring cells and by receiving respective response messages, the macro cell may acquire information on a distance and gap between the small cells. Alternatively, by using an OTDOA (Observed Time Difference of Arrival) process and/or a GPS (Global Positioning System) system, and so on, the macro cell may acquire information on a distance and gap between the small cells.

Additionally, the macro cell may collect information on a time period during which the user equipment remains in a specific small cell, information on a moving direction of the user equipment, information on a moving speed, and so on, within the coverage of the macro cell. For example, in case a train railway exists within the coverage of the macro cell, a moving path (or travel path) and a moving speed (or travel speed) of the user equipment, which is moving (or travelling) along the train railway, and a time period during which the user equipment remains in the small cell are relatively consistent. Accordingly, the macro cell may collect and manage information on the user equipment, which is consistently moving (or travelling) within the coverage of the macro cell.

As described above, since the macro cell is knows about the information on the location relationship between the small cells, the macro cell may be capable of knowing in advance of the patterns of the small cells that are being connected in accordance with the movement (or travel) of the user equipment. More specifically, the macro cell may store in the database and manage patterns of a time order and time interval according to which the user equipment is being connected to small cells, which are positioned at constant intervals.

Referring to the details shown in FIG. 6, first of all, the user equipment receives a downlink signal, which is transmitted at an intensity level (or intensity) greater than or equal to a threshold value, from a neighboring small cell. The signal that is being received from the small cell may correspond to a synchronization signal or discovery signal of a small cell or may correspond to a discovery signal of a cluster, which is configured of two or more neighboring small cells. By measuring a RSRP (Reference Signal Received Power) or a RSRQ (Reference Signal Received Quality) of the downlink signal being received from the small cell, the user equipment may know that the intensity level of the downlink signal is greater than or equal to the threshold value.

Subsequently, the user equipment may transmit a report message to the macro cell, wherein the report message notifies the downlink signal received from the small cell is being received at an intensity level equal to or greater than the threshold value. (S610) The report message may include identification information of the small cell, which has transmitted the downlink signal to the user equipment, and the intensity level of the downlink signal.

If the report message is received from the user equipment in S610, the macro cell may extract information on the small cells to which the user equipment is to be connected in accordance with the movement of the user equipment from the pre-stored database. More specifically, among the plurality of small cells within the coverage, the macro cell may select one or more small cells based upon the movement pattern of the user equipment. For example, the macro cell may know to which small cell the user equipment is adjacent from the identification information included in the report message, and the macro cell may predict the movement path of the user equipment form such information of the report message, which is reported by the user equipment.

Meanwhile, small cells that are being connected within the coverage of the macro cell in accordance with the movement of the user equipment may be referred to as a small cell cluster. A small cell cluster includes a plurality of small cells selected by the macro cell. Among the small cells located within its coverage, the macro cell may select the small cells that are being connected in accordance with the movement pattern of the user equipment as the small cell cluster.

Subsequently, the user equipment receives a RRC configuration message (Radio Resource Control configuration message), which indicates the connection with the small cell cluster, from the macro cell. (S620) More specifically, the macro cell may direct the user equipment to establish connection to the small cell cluster including the plurality of small cells.

The RRC configuration message may include at least one of a PCID (Physical Cell ID) of a small cell, information on resource being supported by the small cell (e.g., frequency information), CIF (Carrier Indicator Field), addition time information of the small cell, activation time information of the small cell, deactivation time information of the small cell, and removal time information of the small cell. Additionally, the RRC configuration message may include the diverse information described above with respect to each small cell. For example, in case three small cells are included in a small cell cluster, the macro cell may include the PCID, frequency, addition time information, activation time information, and so on, with respect to each of the three small cells in the RRC configuration message and may, then, transmit the RRC configuration message.

The user equipment that has received the RRC configuration message from the macro cell adds a connection to a small cell in accordance with the addition time information, which is included in the RRC configuration message. (S630) In case the addition time information respective to the plurality of small cells included in the small cell cluster is identical, the user equipment may simultaneously add the connection with the plurality of small cells. Conversely, in case the addition time information respective to the plurality of small cells is different, the user equipment may add each connection at different time points designated with respective to each small cell. A detailed exemplary embodiment related to step S630 will be described in detail with reference to FIG. 7 and FIG. 8.

Subsequently, the user equipment that has added the connection with the small cells activates the connection to each of the small cells in accordance with the activation time information included in the RRC configuration message. (S640) More specifically, in case the user equipment has established an initial connection with a small cell, the connection with the small cell is in a deactivated state. Accordingly, the user equipment may activate the connection with the small cell, which is in the deactivated state, in accordance with the activation time information, which is designated by the RRC configuration message.

The user equipment performs communication with the small cell through the activated connection with the small cell. (S650) More specifically, the user equipment may establish a RRC connection with the small cell and may, then, receive a downlink signal from the small cell and transmit an uplink signal to the small cell. As the user equipment moves (or travels), the plurality of small cells included in the small cell cluster are sequentially activated, and the user equipment may perform communication by changing to and from small cells being the targets of the RRC connection state.

According to the above-described exemplary embodiment, the user equipment is not required to unnecessarily perform numerous receptions of the RRC configuration message even in a heterogeneous cell environment, wherein multiple small cells are positioned to be neighboring (or adjacent to) one another. More specifically, since the macro cell designates the connection to the small cell cluster, which is being selected in accordance with the movement (or travel) path of the user equipment, to the user equipment, the user equipment and cells may undergo less burden (or load) respective to the RRC configuration (or establishment) procedure, which is performed each time a small cell is being connected.

Figure 7:
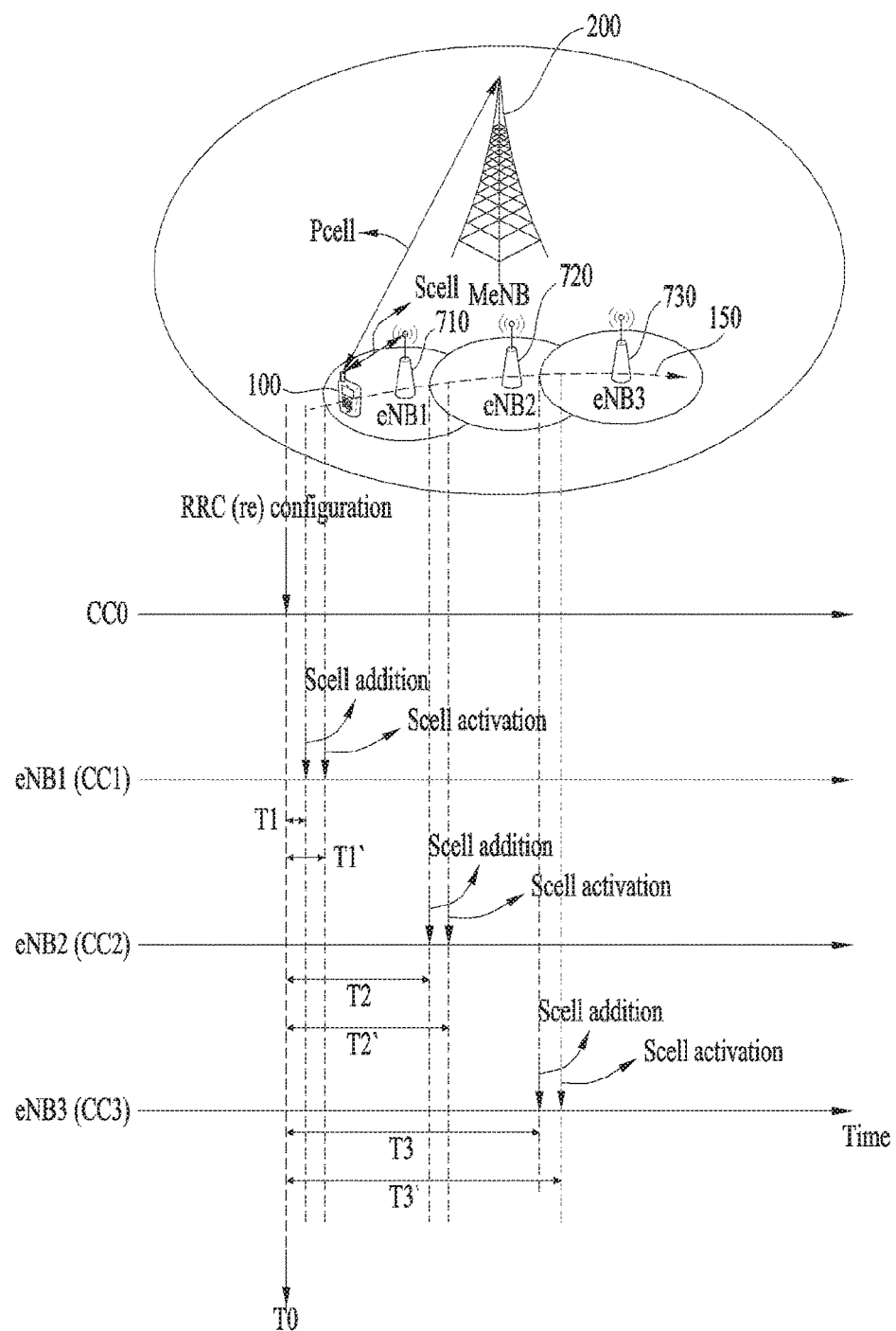
FIG. 7 illustrates a RRC establishment procedure according to an exemplary embodiment of the present invention.

FIG. 7 illustrates a RRC establishment procedure according to an exemplary embodiment of the present invention.

FIG. 7 illustrates a heterogeneous cell environment, wherein a macro cell configured of macro cell base station (200) and a small cell configured of three small cell base stations (710, 720, 730) co-exist. In FIG. 7, the user equipment (100) has dual connectivity with respect to the macro cell and the small cell and moves (or travels) along path 150. Additionally, the small cell configured of three small cell base stations (710, 720, 730) configure one small cell cluster. Carrier CC0, which is supported by the macro cell base station (200), and carriers CC1, CC2, and CC3, which are respectively supported by the small cell base stations (710, 720, 730), may be identical to one another or different from one another.

The user equipment (100) that has entered the macro cell moves along path 150 and receives a downlink signal from a first small cell (configured of a first small cell base station (710)). In case the intensity of the signal being received from the first small cell is measured to be equal to or greater than the threshold value, the user equipment (100) transmits a report message reporting this information to the macro cell (configured of the macro cell base station (200)).

As described above in FIG. 6, the macro cell may collect in advance location relationships respective to the plurality of small cells. Accordingly, in case path 150 of the user equipment (100) is consistent, when the user equipment (100) is connected to the first small cell, the macro cell may know in advance that the user equipment (100) will then be sequentially connected to a second small cell and a third small cell. Accordingly, the macro cell may decide a small cell cluster, which is configured of the first small cell, the second small cell, and the third small cell.

At time (or time point) T0, the macro cell transmits a RRC configuration message to the user equipment (100). The RRC configuration message may direct the user equipment (100) to be connected to the small cell cluster, which is configured of the first small cell, the second small cell, and the third small cell. More specifically, the RRC configuration message may include information on a time (or time point) at which the connection to each of the three small cells is to be added and information on a time (or time point) at which the connection to each of the three small cells is to be activated.

First of all, after time has elapsed as much as T1 from time point T0, the user equipment (100) adds its connection with the first small cell. Thereafter, after time has elapsed as much as T1' from time point T0, the user equipment (100) activates its connection with the first small cell. As shown in the drawing, the activation time information may indicate a predetermined time section starting from the time point at which the RRC configuration message has been received. Alternatively, unlike in the exemplary embodiment shown in the drawing, the activation time information may also indicate a predetermined time section (section T1'-T1) starting from a time point (time point after an elapse of time as much as T1 from time point T0) indicated by the addition time information.

The user equipment (100) activates its connection with the first small cell and enters a RRC connection state with the first small cell. Thereafter, the user equipment (100) performs communication with the first small cell.

Meanwhile, the user equipment (100) moves along path 150, and, as the user equipment (100) moves further away from the first small cell, the intensity level of the downlink signal that is being received may become weaker. An exemplary embodiment of the connection of the user equipment (100) with the first small cell due to the intensity level of the downlink signal being measured to be less than the threshold value will hereinafter be described in detail with reference to FIG. 9.

In accordance with the addition time information of the RRC configuration message, which is received at T0, after time has elapsed as much as T2 from time point T0, the user equipment (100) adds its connection with the second small cell. More specifically, even if the user equipment (100) does not additionally receive a RRC configuration message from the macro cell, the user equipment (100) may add its connection with the second small cell. Thereafter, after time has elapsed as much as T2' from time point T0, the user equipment (100) activates its connection with the second small cell. The user equipment (100) may communicate with the second small cell through its activated connection with the second small cell.

Similarly, the user equipment (100) adds its connection with the third small cell at a time point when time has elapsed as much as T3 from time point T0. Subsequently, the user equipment (100) may activate its connection to the third small cell at a time point when time has elapsed as much as T3' and may then perform communication with the third small cell.

More specifically, based upon the RRC configuration message that is received at time point T0, the user equipment (100) may travel along path 150 and may add and activate each of the connections with first small cell, the second small cell, and the third small cell, which are included in the small cell cluster. Accordingly, the burden of having to receive a RRC configuration message from the macro cell each time the connection status with each of the small cells is changed may be reduced.

Meanwhile, the macro cell may transmit the RRC configuration message to each of the small cells. In case the schedulers respective to each of the macro cell and the small cells operate independently, the values configured in the user equipment (100) by the macro cell shall also be known to the small cells in order to allow the communication with the user equipment (100) to be performed smoothly. Accordingly, the macro cell may also deliver the RRC configuration message to the small cells as well as the user equipment (100).

The macro cell may transmit a message to a cluster header, which corresponds to any one of the small cells, or may transmit a message to each of the small cells. In case a message is transmitted to the cluster header, the cluster header may transmit the message to each of the small cells. In order to transmit the RRC configuration message to the small cell, the macro cell may user a X2 interface or an interface that is similar to the X2.

Meanwhile, in the description presented above, although it is described that the addition time information and the activation time information respectively indicate a specific time, in case of considering a movement speed (or rate) of the user equipment (100), a distance may be indicated instead of the time. The exemplary embodiment considering the movement speed (or rate) of the user equipment (100) will hereinafter be described in detail with reference to FIG. 11.

Furthermore, in accordance with the network status, if the macro cell determines that reconfiguration of diverse time information is being required, the macro cell may re-transmit the RRC configuration message itself to the user equipment (100). More specifically, the macro cell may include newly designated addition/activation/deactivation/removal time information in the RRC configuration (or re-configuration) message and may transmit the RRC configuration (or re-configuration) message to the user equipment (100).

Meanwhile, as described above, although the dual connectivity in the heterogeneous cell environment may be similar to carrier aggregation, the two concepts shall be differentiated from one another and shall be understood accordingly. More specifically, the user equipment (100) is assigned with different CCs in accordance with its position (or location) within the macro cell. More specifically, instead of being simply scheduled with two or more CCs, the user equipment (100) may be scheduled with different CCs in accordance with path 150 of the user equipment (100), the elapsed time, and so on.

Figure 8:
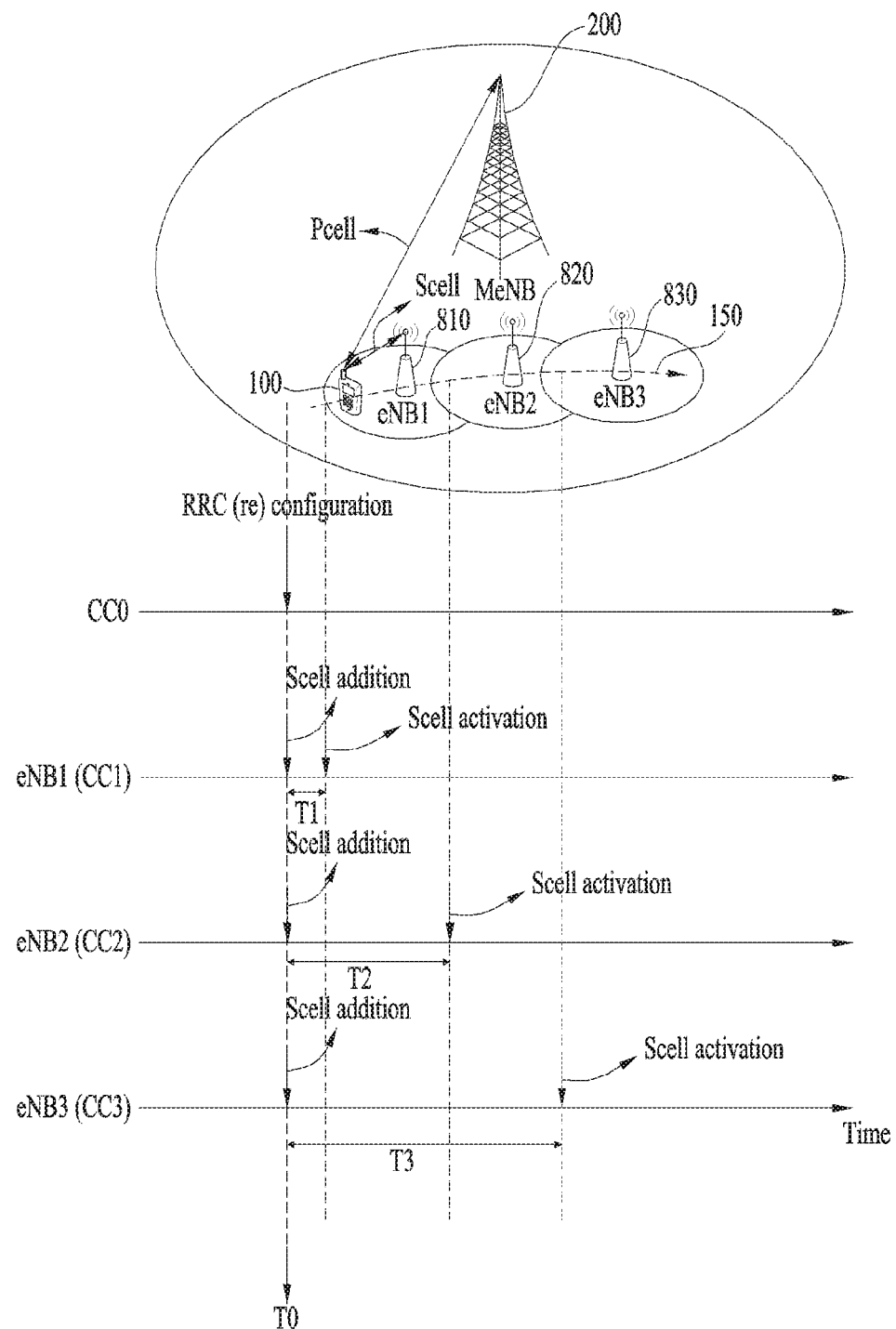
FIG. 8 illustrates a RRC establishment procedure according to another exemplary embodiment of the present invention.

FIG. 8 illustrates a RRC establishment procedure according to another exemplary embodiment of the present invention. FIG. 8 illustrates a heterogeneous cell environment, wherein a macro cell configured of macro cell base station (200) and a small cell configured of three small cell base stations (810, 820, 830) co-exist. In FIG. 8, the user equipment (100) has dual connectivity with respect to the macro cell and the small cell and moves (or travels) along path 150. Additionally, the small cell configured of three small cell base stations (810, 820, 830) configure one small cell cluster. In FIG. 8, detailed description of the parts that overlap with FIG. 7 will be omitted.

The user equipment (100) moves along path 150 and receives a RRC configuration message from the macro cell. In case the RRC configuration message indicates the addition time information for adding the each connection with the three small cells as the same time point, the user equipment (100) may add all connections with respect to the three small cells at the same time. For example, the user equipment (100) may receive the RRC configuration message at time T0 and may immediately add the connections with the three small cells, which configure the small cell cluster.

Subsequently, the user equipment (100) sequentially activates its connections with each of the first small cell, the second small cell, and the third small cell after the respective time points when T1, T2, and T3 have elapsed from time T0, based upon the activation time information, which is included in the RRC configuration message. The user equipment (100) may perform communication while maintaining its RRC connection with the previous small cell until its connection with a new small cell is activated.

Figure 9:
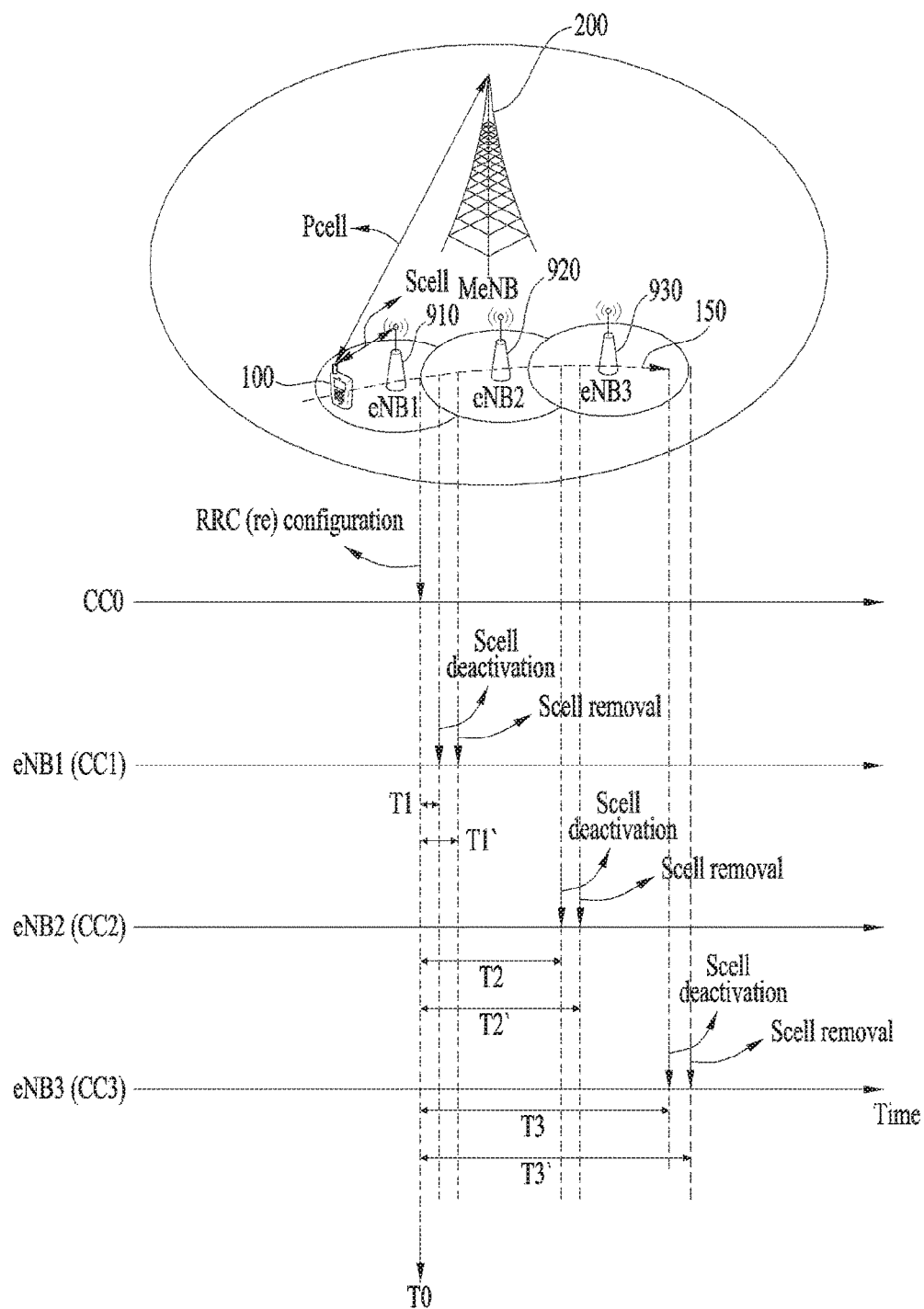
FIG. 9 illustrates a RRC establishment procedure according to yet another exemplary embodiment of the present invention.

FIG. 9 illustrates a RRC establishment procedure according to yet another exemplary embodiment of the present invention. FIG. 9 illustrates a heterogeneous cell environment, wherein a macro cell configured of macro cell base station (200) and a small cell configured of three small cell base stations (910, 920, 930) co-exist. In FIG. 9, the user equipment (100) has dual connectivity with respect to the macro cell and the small cell and moves (or travels) along path 150. Additionally, the small cell configured of three small cell base stations (910, 920, 930) configure one small cell cluster. In FIG. 9, detailed description of the parts that overlap with FIG. 7 and FIG. 8 will be omitted.

In case the user equipment (100) moves further away from the first small cell as the user equipment (100) moves along path 150, the intensity level of the downlink signal that is being received from the first small cell may gradually become weak. Accordingly, in case the intensity level of the signal transmitted from the first small cell is measured to be less than the threshold value, the user equipment (100) may report a report message reporting this information to the macro cell.

After receiving the report message, the macro cell transmits a RRC reconfiguration message for deactivating/removing the connection with the first small cell, the second small cell, and the third small cell, which are included in the small cell cluster, to the user equipment (100). The RRC reconfiguration message may include removal time information and may also include deactivation time information along with the removal time information.

If the RRC reconfiguration message is received at time T0, the user equipment (100) deactivates its connection with the first small cell at a time point when time has elapsed as much as T1 from time T0. The user equipment (100) may not perform communication with the small cell through its deactivated connection. Subsequently, in accordance with the deactivation time information, the user equipment (100) removes its connection with the first small cell at a time point when the time has elapsed as much as T1' from time T0. Similarly, the user equipment (100) may deactivate/remove its connection with the second small cell at a time point when time has elapsed as much as T2/T2' at time T0, and the user equipment (100) may deactivate/remove its connection with the third small cell at a time point when time has elapsed as much as T3/T3' at time T0.

Meanwhile, as described above, the RRC reconfiguration message may include only the removal time information. In this case, the user equipment (100) immediately removes its connection with the small cell without performing deactivation. More specifically, the connection with the small cell may be removed while being in an activated state. Even if the deactivation time information is not transmitted, the user equipment (100) may shift its connection with the small cell to a deactivated state, in case the communication with the small cell is not realized for a predetermined period of time.

Figure 10:
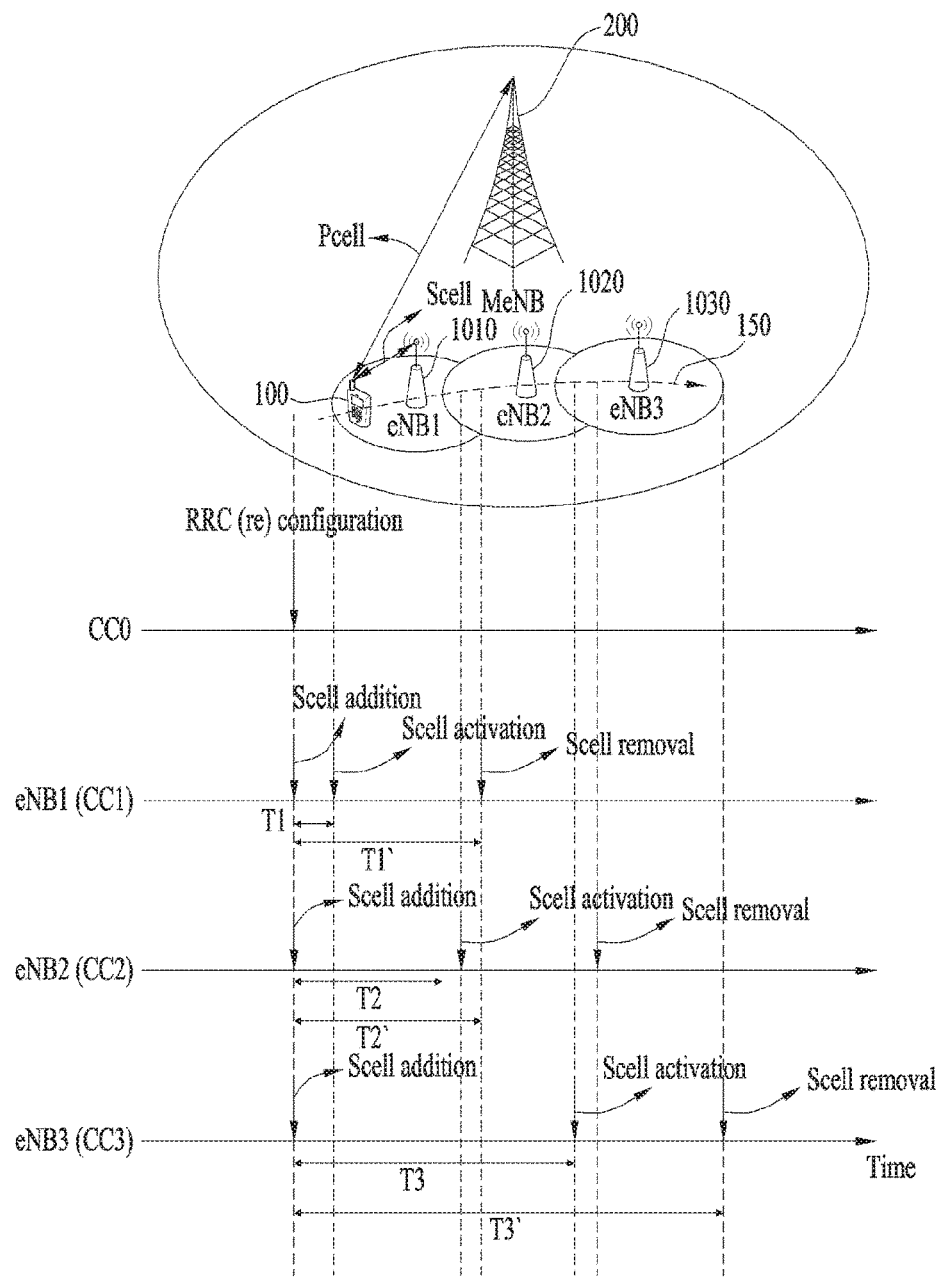
FIG. 10 illustrates a RRC establishment procedure according to yet another exemplary embodiment of the present invention.

FIG. 10 illustrates a RRC establishment procedure according to yet another exemplary embodiment of the present invention. FIG. 10 illustrates a heterogeneous cell environment, wherein a macro cell configured of macro cell base station (200) and a small cell configured of three small cell base stations (1010, 1020, 1030) co-exist. In FIG. 10, the user equipment (100) has dual connectivity with respect to the macro cell and the small cell and moves (or travels) along path 150. Additionally, the small cell configured of three small cell base stations (1010, 1020, 1030) configure one small cell cluster. In FIG. 10, detailed description of the parts that overlap with FIG. 7, FIG. 8, and FIG. 9 will be omitted.

In the exemplary embodiment shown in FIG. 10, the deactivation time information and the removal time information are included in the RRC configuration message and then transmitted. More specifically, when the macro cell transmits a RRC configuration message to the user equipment (100) for the first time, the macro cell may include all of the information on the addition/activation/deactivation/removal time of the connection with the small cell cluster in the RRC configuration message and then transmit the message.

Accordingly, the user equipment (100) moves along path 150, and even if the intensity level of the signal being received from the first small cell becomes weak, the user equipment (100) does not additionally report this. More specifically, the user equipment may respectively remove its connection with the first/second/third small cell at a time point when time has elapsed as much as T1'/T2'/T3' at time T0 in accordance with the removal time information, which is included in the RRC configuration message received from the macro cell.

As shown in the drawing, the removal time information may be designated as T1'/T2'/T3', which respectively corresponds to time section starting from the time point at which the RRS configuration message is received.

Figure 11:
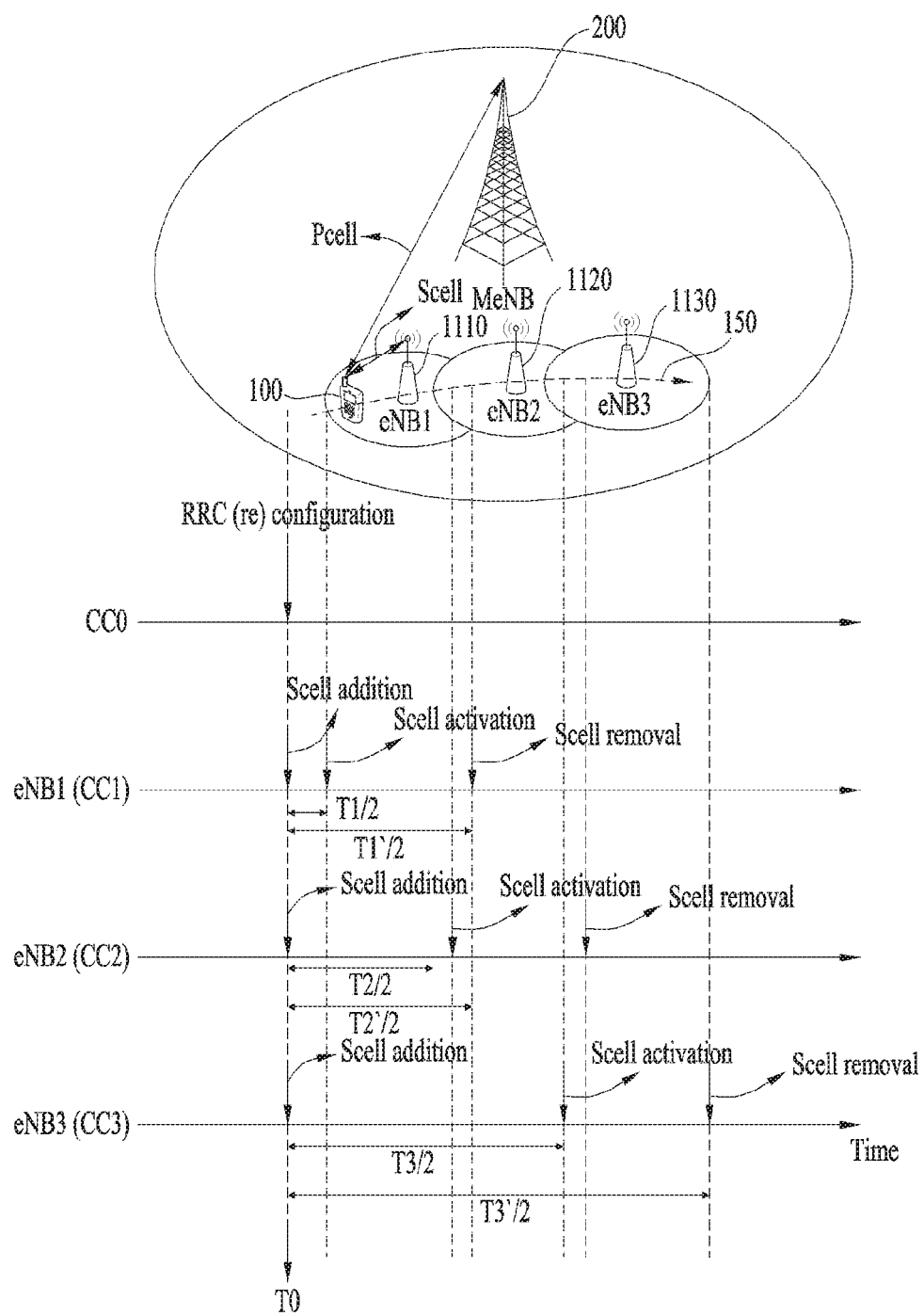
FIG. 11 illustrates a RRC establishment procedure according to yet another exemplary embodiment of the present invention.

FIG. 11 illustrates a RRC establishment procedure according to yet another exemplary embodiment of the present invention. FIG. 11 illustrates a heterogeneous cell environment, wherein a macro cell configured of macro cell base station (200) and a small cell configured of three small cell base stations (1110, 1120, 1130) co-exist. In FIG. 11, the user equipment (100) has dual connectivity with respect to the macro cell and the small cell and moves (or travels) along path 150. Additionally, the small cell configured of three small cell base stations (1110, 1120, 1130) configure one small cell cluster. In FIG. 11, detailed description of the parts that overlap with FIG. 10 will be omitted.

Even if user equipments (100) move along the same path, each user equipment (100) may have a different movement speed (or travel speed). More specifically, a time during which a user equipment (100) remains in a small cell, a time during which a user equipment (100) adds its connection with a small cell, or a time up to a point when a user equipment activates, deactivates, or ends its connection with a small cell may be different for each user equipment (100).

Accordingly, in case the macro cell indicates the same time point information to all user equipments through the RRC configuration message, the communication may not be performed smoothly.

According to an exemplary embodiment of the present invention, in changing the connection status with a small cell, the movement speed of the user equipment (100) may be applied. First of all, the user equipment (100) measures its own movement speed. In order to measure its movement speed, the user equipment (100) may calculate a number of cell selection sessions or a number of handover sessions. For example, the user equipment (100) may compare the calculated value with a threshold value, and, then, based upon the compared result, the user equipment (100) may determine the movement speed as any one of high, medium, and normal.

The macro cell may include a field, which directs the movement speed of the user equipment (100) to be additionally considered, in the RRC configuration message. In case the value of the corresponding field is equal to '1', the user equipment (100) may adjust the time indicated by the addition/activation/deactivation/removal time information, which is included in the RRC configuration message. For example, the user equipment (100) may multiply each time information by a scaling factor, which is determined in accordance with the movement speed. In case the value of the corresponding field is equal to '0', the user equipment (100) may use the time information designated by the RRC configuration message regardless of its own movement speed.

According to an exemplary embodiment, in case the movement speed is determined to be 'high', the scaling factor may be equal to 0.25, and the scaling factor of a case when the movement speed is determined to be 'medium' may be equal to 0.5, and the scaling factor of a case when the movement speed is determined to be 'normal' may be equal to 1. In the exemplary embodiment shown in FIG. 11, the user equipment (100) measures its own movement speed as 'medium', and the scaling factor becomes 0.5.

In the RRC configuration message, the addition time information respective to each small cell is included as T1, T2, and T3 and transmitted accordingly. However, in case the value of the field directing the user equipment (100) to apply the movement speed within the RRC configuration message is equal to '1', the user equipment (100) may apply a scaling factor of 0.5 and may, then, adjust the addition time information to T1/2, T2/2, and T3/2. More specifically, the user equipment (100) may add its connection with each small cell at a time point when half of the time, which is designated by the RRC configuration message, has elapsed. Similarly, the user equipment (100) may also apply the scaling factor to the activation/removal time information, and, although it is not shown in the drawing, the scaling factor may also be applied to the deactivation time information.

Meanwhile, in case the movement speed measured by the user equipment (100) is changed, the user equipment (100) may transmit information notifying the change in the movement speed and information on a newly measured movement speed to the macro cell. Alternatively, the user equipment (100) may also request the macro cell to reconfigure its connection with the small cell. The message requesting for a reconfiguration may be configured of a field notifying that the message corresponds to a reconfiguration request message, a CIF of a specific small cell, a PCID of a specific small cell, ECGI, and so on.

After receiving the reconfiguration request message, the macro cell may transmit a RRC reconfiguration message based upon the new movement speed of the user equipment (100). More specifically, the macro cell may adjust the addition/activation/deactivation/removal time information in accordance with the movement speed of the user equipment (100) and may, then, transmit the RRC reconfiguration message to the user equipment (100). The user equipment may change its connection status with the small cells in accordance with the received RRC reconfiguration message and may, then, perform communication accordingly.

Meanwhile, in case the user equipment (100) adjusts the time information in accordance with its movement speed, each small cell may not be capable of knowing this fact. Accordingly, the user equipment (100) according to the exemplary embodiment may report information related to its movement speed to the macro cell in order to easily receive scheduling from the small cells.

More specifically, the user equipment (100) verifies that the value of the field applying the movement speed in the RRC configuration message is equal to '1', and, then, the user equipment (100) may report the measured movement speed to the macro cell. Subsequently, the macro cell may deliver a message including the adjusted time information to the small cell cluster header or to each of the small cells.

According to yet another exemplary embodiment, after activating its connection with each small cell, the user equipment (100) may feedback and transmit the information on its own movement speed to the small cells. Accordingly, the small cells may adjust the deactivation/removal time information, which is received from the macro cell, and may then perform scheduling respective to the user equipment (100). The information being fed-back by the user equipment (100) to the small cells may correspond to the information on the movement speed, and the information may also correspond to the time information itself, which is adjusted by having the movement speed applied thereto.

Figure 12:
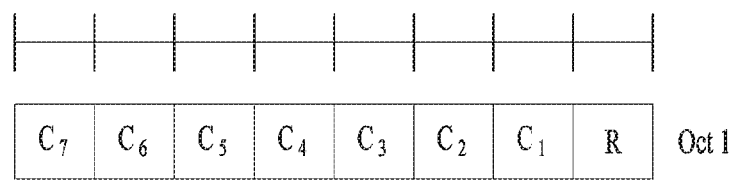
FIG. 12 illustrates a MAC control signal according to an exemplary embodiment of the present invention.

FIG. 12 illustrates a MAC control signal according to an exemplary embodiment of the present invention. In the description provided above, an exemplary embodiment of a case when the RRC configuration message is received from the macro cell and when the user equipment statically changes its connection status has been described. However, in case a MAC (Medium Access Control) control signal is received from the macro cell, the user equipment may consider the MAC control signal at a higher priority level and may, then, dynamically change its connection status.

More specifically, the macro cell may determine that the movement path or movement speed, and so on, of the user equipment does not match with a pre-stored pattern, or that the connection status of the small cells is required to be directly managed. For example, in a specific situation, wherein the channel status with a user equipment changes abruptly, even if the macro cell is required to endure a signal overhead respective to the adjustment of the connection status, the macro cell may directly adjust (or control) the connection status of the user equipment through the MAC control signal.

More specifically, in accordance with the MAC control signal, the user equipment may activate its connection with a small cell earlier than the activation time information, which is designated by the RRC configuration message. Additionally, despite the deactivation time information, which is designated by the RRC configuration message, the user equipment may continue to activate its connection with a small cell in accordance with the MAC control signal.

Meanwhile, such MAC control signal may be identified by a sub header of a MAC PDU. As shown in the drawing, the MAC control signal may be configured of a signal octet including 7 C-fields and 1 R-field and may have a fixed size.

The C-field indicates that each of the indicated small cells shall be activated/deactivated. In case the value of the C-field is equal to '1', this may indicate that a small cell is to be activated, and, in case the value is equal to '0', this may indicate that a small cell is to be deactivated. As a reserved bit, the R-field may be designated to be equal to '0'. Alternatively, the R-field may also be used as a field applying the movement speed of a user equipment to the addition/activation/deactivation/removal time of the respective small cell.

4. Apparatus Structure

FIG. 13 is a block diagram of a structure of a UE 100 and an eNB 200 according to an embodiment of the present invention.

In FIG. 13, the UE 100 and the eNB 200 may include radio frequency (RF) units 110 and 210, processors 120 and 220, and memories 130 and 230, respectively. Although FIG. 13 illustrates a 1:1 communication environment between the UE 100 and the eNB 200, a communication environment between a plurality of UEs and the eNB 200 can also be established. In addition, the eNB 200 of FIG. 13 can be applied to both a macro cell eNB and a small cell eNB.

The RF units 110 and 210 may include transmitters 112 and 212 and receivers 114 and 214, respectively. The transmitter and 112 and the receiver 114 of the UE 100 may be configured to transmit and receive signals to and from the eNB 200 and other UEs and the processor 120 may be functionally connected to the transmitter 112 and the receiver 114 to control a process of transmitting and receiving signals to and from other devices by the transmitter 112 and the receiver 114. The processor 120 performs various processing processes on signals to be transmitted and then transmits the processed signals to the transmitter 112 and performs processing on the signals received by the receiver 114.

As necessary, the processor 120 may store information contained in exchanged message in the memory 130. Based on this structure, the UE 100 can perform various methods according to the aforementioned embodiments of the present invention.

The transmitter 212 and the receiver 214 of the eNB 200 may be configured to transmit and receive signals to and from other eNBs and UEs and the processor 220 may be functionally connected to the transmitter 212 and the receiver 214 to control a process of transmitting and receiving signals to and from other devices by the transmitter 212 and the receiver 214. The processor 220 performs various processing processes on signals to be transmitted and then transmits the processed signals to the transmitter 212 and performs processing on the signals received by the receiver 214. As necessary, the processor 220 may store information contained in exchanged message in the memory 230. Based on this structure, the eNB 200 can perform various methods according to the aforementioned embodiments of the present invention.

The processors 120 and 220 of the UE 100 and the eNB 200 requests (e.g., controls, manipulates, manages, etc.) operations of the UE 100 and the eNB 200, respectively. The processors 120 and 220 may be connected to the memories 130 and 230 for storing program codes and data, respectively. The memories 130 and 230 may be connected to the processors 120 and 220 to stores operating system (OS), an application, and general files.

The processors 120 and 220 according to the present invention can also be called a controller, a microcontroller, a microprocessor, a microcomputer, etc. The processors 120 and 220 may be embodied in the form of hardware, firmware, software, or a combination thereof. When an embodiment of the present invention is embodied using hardware, the processors 120 and 220 may include application specific integrated circuits (ASICs), digital signal processors (DSPs), digital signal processing devices (DSPDs), programmable logic devices (PLDs), field programmable gate arrays (FPGAs), or the like which is configured to embody the present invention.

The embodiments of the present invention may be written as computer programs and can be implemented in general-use digital computers that execute the programs using a computer readable recording medium. In addition, a structure of data used in the above-described method may be recorded in a computer readable recording medium through various methods. Program storage devices used for description of a storage device containing an executable computer code for execution of the various methods according to the present invention is not understood as temporary objects such as carrier waves or signals. Examples of the computer readable recording medium include magnetic storage media (e.g., ROMs, floppy disks, hard disks, etc.) and optical recording media (e.g., CD-ROMs, or DVDs).

The embodiments of the present invention may have the following advantageous effects.

First, in a heterogeneous cell deployment, dual connectivity with an adjacent cell to a UE may be configured to remove influence of interference due to a relation with the adjacent cell.

Second, in the heterogeneous cell deployment, influence of a DL interference signal received from the adjacent cell by the UE and influence of a UL interference signal transmitted to the adjacent cell from the UE can be reduced.

Third, dual connectivity can be configured by the UE as well as an eNB. Thus, even if a communication system deployment and a network situation are changed, reliable dual connectivity configuration may be possible.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing a communication by a user equipment having dual connectivity in a heterogeneous cell environment, wherein a macro cell and a small cell co-exist, the method comprising:

transmitting a first report message to the macro cell, the first report message reporting that a downlink signal is received from a small cell at an intensity level greater than or equal to a threshold value;

receiving a RRC configuration message (Radio Resource Control configuration message) from the macro cell, the RRC configuration message indicating a connection with a small cell cluster including the small cell;

adding a plurality of connections with a plurality of small cells included in the small cell cluster in accordance with addition time information included in the RRC configuration message; and activating each of the plurality of connections with the plurality of small cells in accordance with activation time information, the activation time information being included in the RRC configuration message, wherein the small cell cluster is determined based on information of a location relationship between the plurality of small cells, and wherein, when the RRC configuration message comprises an indicator indicating an application of a movement speed of the user equipment, the addition time information and the activation time information are adjusted in accordance with the movement speed.

2. The method of claim 1, further comprising:
performing a communication in a RRC connected state through an activated connection with a small cell of the small cell cluster.

3. The method of claim 1, wherein, when the addition time information indicates a same time point with respect to the plurality of small cells, the adding comprises adding the plurality of connections with the plurality of small cells simultaneously.

4. The method of claim 1, wherein, when the addition time information indicates different time points with respect to the plurality of small cells, the adding comprises sequentially adding the plurality of connections with the plurality of small cells in accordance with the addition time information.

5. The method of claim 1, further comprising:
when a downlink signal having an intensity lower than a threshold value is received from an activated small cell, transmitting a second report message to the macro cell;
receiving a RRC reconfiguration message from the macro cell, the RRC reconfiguration message indicating a removal of the connection with the small cell cluster; and
removing the connection with the plurality of small cells included in the small cell cluster in accordance with removal time information included in the RRC reconfiguration message.

6. The method of claim 5, wherein the RRC reconfiguration message further includes deactivation time information, and
wherein the method further comprises deactivating the activated connection with the small cell in accordance with the deactivation time information, prior to deactivating the connection with the plurality of small cells.

7. The method of claim 1, wherein the RRC configuration message includes at least one of PCID (Physical Cell ID), ECGI (E-UTRAN Cell Global Identifier), frequency, CIF (Carrier Indicator Field), the addition time information, the activation time information, deactivation time information, and removal time information of each of the plurality of small cells.

8. The method of claim 1, wherein the macro cell acquires information related to the location relationship by using at least one of PRACH (Physical Random Access Channel) transmission with the plurality of small cells, OTDOA (Observed Time Difference of Arrival) process, or GPS (Global Positioning System).

9. The method of claim 1, wherein the method further comprises measuring the movement speed of the user equipment.

10. A user equipment having dual connectivity in a heterogeneous cell environment, wherein a macro cell and small cells co-exist, and performing communication, the user equipment comprising:
a transmitting unit;
a receiving unit; and
a processor,
wherein the processor is configured:
to transmit a first report message to the macro cell, the first report message reporting that a downlink signal is received from a small cell at an intensity level greater than or equal to a threshold value, through the transmitting unit,
to receive a RRC configuration message (Radio Resource Control configuration message) from the macro cell, the RRC configuration message indicating a connection with a small cell cluster including the small cell from the macro cell, through the receiving unit,
to add a plurality of connections with a plurality of small cells included in the small cell cluster in accordance with addition time information included in the RRC configuration message, and
to activate each of the plurality of connections with the plurality of small cells in accordance with activation time information, the activation time information being included in the RRC configuration message,
wherein the small cell cluster is determined based on information on a location relationship between the plurality of small cells, and
wherein, when the RRC configuration message comprises an indicator indicating an application of a movement speed of the user equipment, the processor adjusts the addition time information and the activation time information in accordance with the movement speed.

11. The user equipment of claim 10, wherein the processor performs a communication in a RRC connected state through an activated connection with a small cell of the small cell cluster.

12. The user equipment of claim 10, wherein, when the addition time information indicates a same time point with respect to the plurality of small cells, the processor adds the plurality of connection with the plurality of small cells simultaneously.

13. The user equipment of claim 10, wherein, when the addition time information indicates different time points with respect to the plurality of small cells, the processor sequentially adds the connection with the plurality of small cells in accordance with the addition time information.

14. The user equipment of claim 10, wherein the processor is further configured to transmit a second report message to the macro cell, when a downlink signal having an intensity lower than a threshold value is received from the activated small cell, through the transmission unit,
to receive a RRC reconfiguration message from the macro cell, the RRC reconfiguration message indicating a removal of a connection with the small cell cluster, through the receiving unit, and
to remove the connection with the plurality of small cells included in the small cell cluster in accordance with removal time information included in the RRC reconfiguration message.

15. The user equipment of claim 14, wherein the RRC reconfiguration message further includes deactivation time information, and
wherein the processor deactivates the activated connection with the small cell in accordance with the deactivation time information, prior to deactivate the connection with the plurality of small cells.

16. The user equipment of claim 10, wherein the RRC configuration message includes at least one of PCID (Physical Cell ID), ECGI (E-UTRAN Cell Global Identifier), frequency, CIF (Carrier Indicator Field), the addition time information, the activation time information, deactivation time information, and removal time information of each of the plurality of small cells.

17. The user equipment of claim 10, wherein the macro cell acquires information related to the location relationship by using at least one of PRACH (Physical Random Access Channel) transmission with the plurality of small cells, OTDOA (Observed Time Difference of Arrival) process, or GPS (Global Positioning System).

18. The user equipment of claim 10, wherein the processor measures the movement speed of the user equipment.

* * * * *